US011212849B2

(12) United States Patent
Blonskey et al.

(10) Patent No.: US 11,212,849 B2
(45) Date of Patent: Dec. 28, 2021

(54) HUMAN MACHINE INTERFACE FOR MISSION CRITICAL WIRELESS COMMUNICATION LINK NODES

(71) Applicant: CoreTigo, Ltd., Netanya (IL)

(72) Inventors: Ofer Blonskey, Even Yehoda (IL); Dan Wolberg, Yanuv (IL)

(73) Assignee: Coretigo, LTD., Netanya (IL)

( * ) Notice: Subject to any disclaimer, the term of this patent is extended or adjusted under 35 U.S.C. 154(b) by 98 days.

(21) Appl. No.: 16/523,236

(22) Filed: Jul. 26, 2019

(65) Prior Publication Data

US 2020/0037375 A1    Jan. 30, 2020

Related U.S. Application Data

(60) Provisional application No. 62/703,555, filed on Jul. 26, 2018.

(51) Int. Cl.
| | |
|---|---|
| *H04W 4/80* | (2018.01) |
| *H04W 64/00* | (2009.01) |
| *H04W 76/10* | (2018.01) |
| *H04W 56/00* | (2009.01) |

(52) U.S. Cl.
CPC ............. *H04W 76/10* (2018.02); *H04W 4/80* (2018.02); *H04W 56/0005* (2013.01); *H04W 64/003* (2013.01)

(58) Field of Classification Search
CPC ..... H04W 76/10; H04W 4/80; H04W 64/003; H04W 56/0005
USPC ........................................................ 370/329
See application file for complete search history.

(56) References Cited

U.S. PATENT DOCUMENTS

| | | |
|---|---|---|
| 9,210,581 B2 | 12/2015 | Toepke et al. |
| 2015/0143009 A1 | 5/2015 | Feinaeugle et al. |
| 2015/0331827 A1 | 11/2015 | Beyer et al. |
| 2016/0162433 A1 | 6/2016 | Kammerer et al. |

(Continued)

OTHER PUBLICATIONS

Erceg, et al., "Wireless LANs TGn Channel Models," IEEE P802.11, May 10, 2004.

(Continued)

*Primary Examiner* — Angel T Brockman
(74) *Attorney, Agent, or Firm* — M&B IP Analysts, LLC

(57) ABSTRACT

A mission critical wireless link (MCWL) node for communicating with a human machine interface (HMI) terminal over a mission critical wireless link is provided. The MCWL node includes a MCWL wireless circuit configured to communicate with a first MCWL node over the mission critical wireless link by employing a mission critical communication protocol; an HMI communication circuit for communicating with an HMI terminal over the mission critical wireless link by employing a short-range communication protocol; a synchronizer for controlling at least a time at which the MCWL wireless circuit and the HMI communication circuit access the wireless link; a multiplexer coupled to the MCWL wireless circuit and the HMI communication circuit, wherein the multiplexer is configured to select any of the MCWL wireless circuit and the HMI communication circuit based on a control signal received from the synchronizer; and a radio frequency (RF) transceiver configured to wirelessly communicate with both the first MCWL node and the HMI terminal.

11 Claims, 14 Drawing Sheets

(56) References Cited

U.S. PATENT DOCUMENTS

| | | |
|---|---|---|
| 2017/0277170 A1 | 9/2017 | Lee et al. |
| 2017/0317916 A1 | 11/2017 | Ozaki et al. |
| 2018/0088563 A1 | 3/2018 | Gutekunst et al. |
| 2018/0106698 A1 | 4/2018 | Karg et al. |
| 2019/0327662 A1* | 10/2019 | Franz ................ H04L 12/40019 |

OTHER PUBLICATIONS

IO-Link Wireless Systems Extensions, Specification, Version 1.1, Mar. 2018, Order No. 10.112, Copyright IO-Link Community 2018, Karlsruhe, Germany, pp. 1-302.

Wolberg, et al., "Simulative Performance Analysis of IO-link Wireless," 4th IEEE International Workshop on Factory CommunicationSystems (WFCS), Jul. 5, 2018.

* cited by examiner

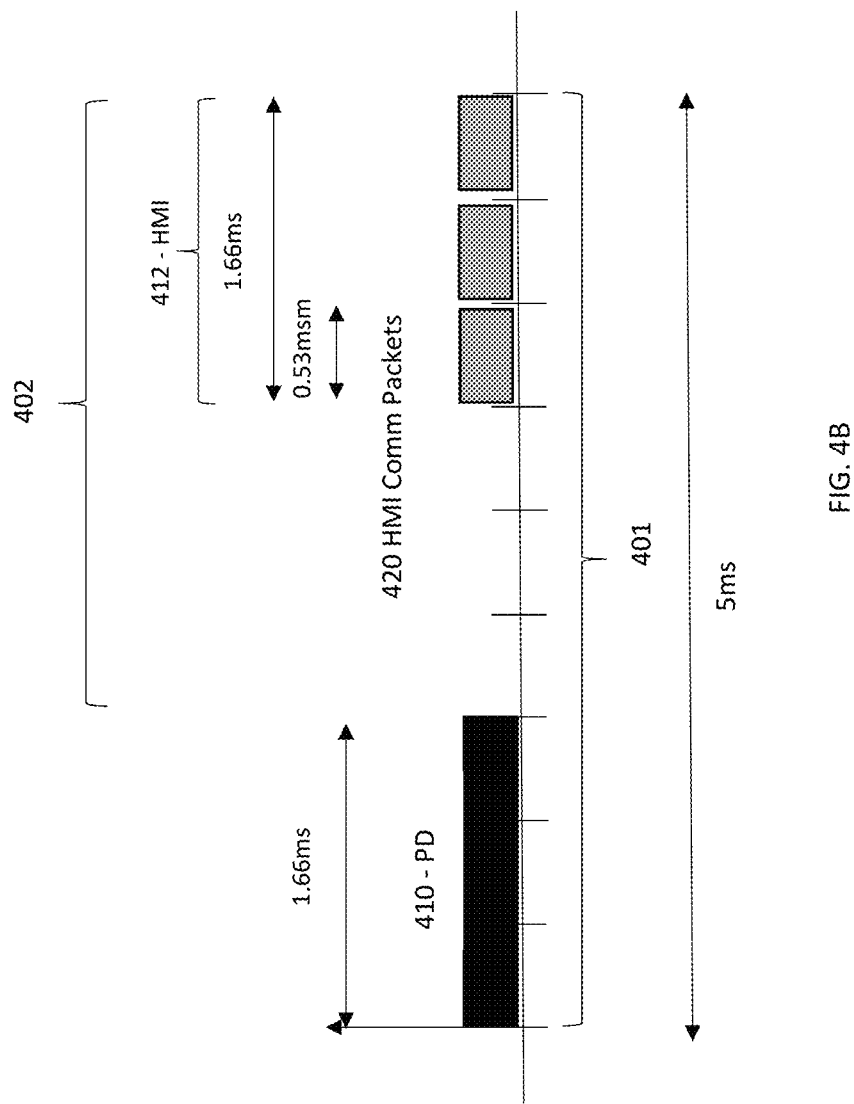

HUMAN MACHINE INTERFACE FOR MISSION CRITICAL WIRELESS COMMUNICATION LINK NODES

CROSS REFERENCE TO RELATED APPLICATIONS

This application claims the benefit of U.S. Provisional Application No. 62/703,555 filed on Jul. 26, 2018, the contents of which are hereby incorporated by reference.

TECHNICAL FIELD

The present disclosure relates generally to the network control and observability of components within an industrial system, and, more particularly, to an implementation of a human machine interface for mission critical wireless communication.

BACKGROUND

Industrial systems include a variety of components such as sensors and actuators that are implemented to execute various automated tasks in order to produce a desired product or carry out a specific process. Each individual industrial component is typically controlled either directly (e.g., an actuator may be instructed to move a robotic arm in a particular manner) or indirectly based on received communications (e.g., the component may be configured to adjust a process based on a received sensor value reading).

As shown in FIG. 1A, an industrial system 100 is used to direct individual connections, e.g., via cables 110, to connect a controller or any computer equipped with Industrial network, such as a programmable logic controller (PLC) 115 or a Programmable Automation Controller (PAC) (not shown), to each component 120 of the system 100. This is a costly setup and produces many inefficiencies, as it requires a multitude of controllers even for a single machine having multiple components. The control signal is transmitted using an analog or a digital signal sent over the individual cables 110. While simple in theory, such a setup requires high maintenance, high setup costs, and significant amounts of time spent configuring and setting up each component of the system.

Alternatively, industrial systems, an example of which is shown in FIG. 1B, include a mission critical link system 130 with a master gateway (or simply "master") 140 connected to a controller 115 and configured to communicate with multiple industrial components ("slaves") 160. The master 140 offers a more centralized approach, with a single master 140 connected to many slaves 160. The connection may be established over direct cable connections 150. A standardized protocol, such as IO-Link®, is an example implementation of such a system.

The master 140 is configured to connect to multiple slaves (e.g., devices that may operate as "slaves" in a master-slave star topology) 160, which may be easily connected to actuators, sensors, and the like (not shown). The sensors may include smart sensors providing valuable diagnostic information as well as updated status reports.

However, this setup retains a number of the drawbacks of the older systems, most notably the requirement for physical cables to be run between a controller and each component of the system. The setup of such wiring is expensive, time-consuming and can be significantly limiting in many industrial applications. For example, running cables in a sealed "clean" room used in many industries can be awkward and can compromise the sealed nature of the room. Further, certain mobile systems that require automated vehicles, e.g., robots configured to move stock or equipment around a warehouse, would be heavily encumbered by requiring a physical cable be attached to each vehicle.

Due to these limitations, a mission critical wireless link (MCWL) system, an example of which is shown in FIG. 1C, has been developed to implement a mission critical link system over wireless communication, thereby obviating the need for cumbersome wires. The IO-Link® Wireless (IOLW) specification is an example of a MCWL system and describes a time-division multiplexing (TDM) network configured to communicate with multiple devices. The master downlink is a single broadcast message per master track (i.e., one message sent for all devices within a track), while the multiple devices and components use a synchronous (i.e., synchronized by an external clock) TDM method for uplink. The master tracks are synchronized and use frequency-division multiplexing (FDM). The master 140 is therefore connected via a wireless link to the various slaves 160.

Access to slave 160 and master 140 deployed in the MCWL system illustrated in FIG. 1C can be performed only using devices that support and/or implement the IOLW's protocol specification. That is, computers, handled devices, or servers can communicate with master and/or slave devices in the MCWL system only if such devices implement the IOLW protocols. As such, monitoring or debugging devices, for example, would require implementing dedicate hardware and software in order to interface with the devices 140 and 160.

In MCWL systems, it is required to wirelessly connect the master 140 and slaves 160 to a human-machine interface (HMI) terminal. An HMI terminal provides a user interface or dashboard that connects a person to a machine, system, or device. In industrial machines, an HMI terminal can be utilized for real time diagnostic, configuration, validation, installation, and debugging.

FIG. 2 shows a wireless connection of an HMI terminal 210 with a master gateway 220 and a slave 230 in an example MCWL system 200. The HMI terminal 210 may be a standalone diagnostic or configuration tool. As illustrated, each element requires Bluetooth Low Energy (BLE) radio to communication with the HMI terminal 210. Specifically, each of the HMI terminal 210, the master 220, and slave 230 includes a BLE transceiver 211, 221, and 231, respectively. The BLE transceiver (radio) operates according to the BLE communication protocol. The master 220 and slave 230 each include a mission critical wireless transceiver (222 and 232, respectively) configured to wirelessly communicate using a MCWL communication protocol (e.g., IOWL). The transceivers 222 and 232 are distinct and separate from BLE radios 221 and 231. Thus, each of the master and slave requires an additional radio component (e.g., a BLE component) in order to communicate with the HMI 210.

This is a major disadvantage since the additional transceiver may interfere the operation of the MCWL system, and thus degrade the performance of the MCWL system. Further, embedding additional radio components increases the cost and may affect the form factor of each node (slave and master gateway).

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure. Some embodiments disclosed herein include a mission critical wireless link (MCWL) node for communicating with a human machine interface (HMI) terminal over a mission critical wireless link comprising: a MCWL wireless circuit configured to communicate with a first MCWL node over the mission critical wireless link by employing a mission critical communication protocol; an HMI communication circuit for communicating with an HMI terminal over the mission critical wireless link by employing a short-range communication protocol; a synchronizer for controlling at least a time at which the MCWL wireless circuit and the HMI communication circuit access the wireless link; a multiplexer coupled to the MCWL wireless circuit and the HMI communication circuit, wherein the multiplexer is configured to select any of the MCWL wireless circuit and the HMI communication circuit based on a control signal received from the synchronizer; and a radio frequency (RF) transceiver configured to wirelessly communicate with both the first MCWL node and the HMI terminal.

Some embodiments disclosed herein also include a method for communicating with a human machine interface (HMI) terminal over a mission critical wireless link (MCWL). The method comprises determining if there is an available time interval for a MCWL node to communicate with the HMI terminal; issuing an HMI grant signal allowing the MCWL node to communicate with the HMI terminal over the mission critical wireless link when there is an available time interval; determining if the available time interval is assigned for an uplink communication or a downlink communication when there is an available time interval; issuing an uplink control signal to allow transmitting HMI messages to the HMI terminal when the available time interval is assigned to the uplink communication; issuing an uplink control signal to allow reception of HMI messages from the HMI terminal when the available time interval is assigned to the downlink communication.

Some embodiments disclosed herein also include a mission critical wireless link (MCWL) system comprising: a first MCWL node configured to communicate with a human machine interface (HMI) terminal over a mission critical wireless link; a second MCWL node configured to communicate with the first MCWL over the wireless link; and an HMI terminal configured to communicate only using a short-range communication protocol.

BRIEF DESCRIPTION OF THE DRAWINGS

The subject matter that is disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 4A, 4B and 4C are time diagrams demonstrating time intervals utilized for HMI communication in a MCWL system.

DETAILED DESCRIPTION

Figure 1A:
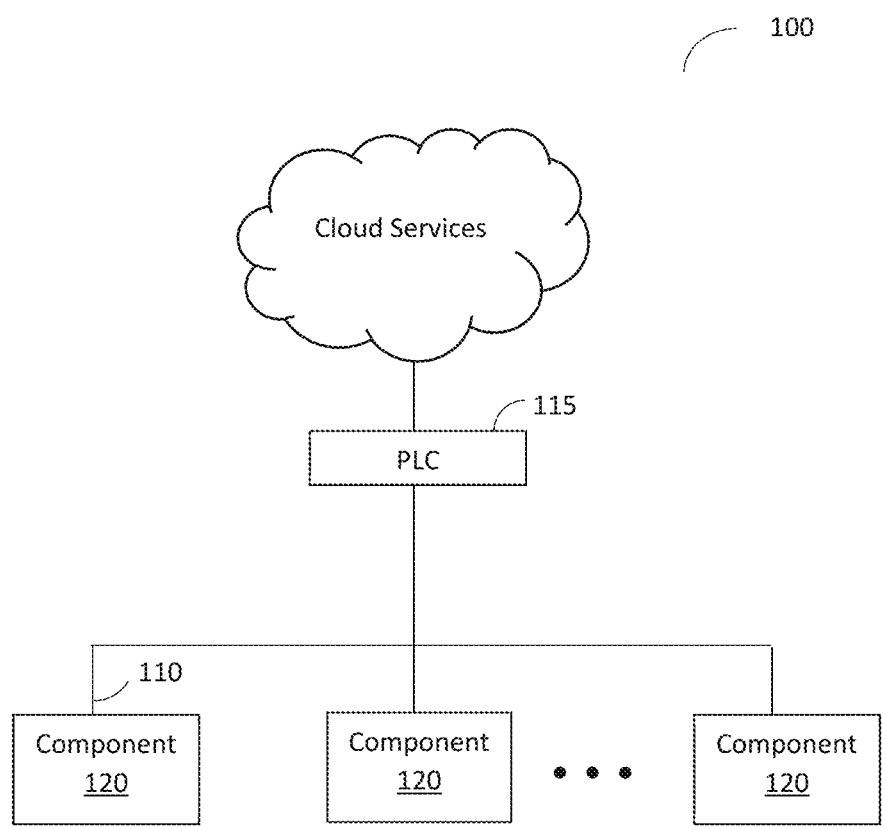
FIGS. 1A and 1B are diagrams of standard techniques for controlling industrial components (prior art).
Figure 1B:
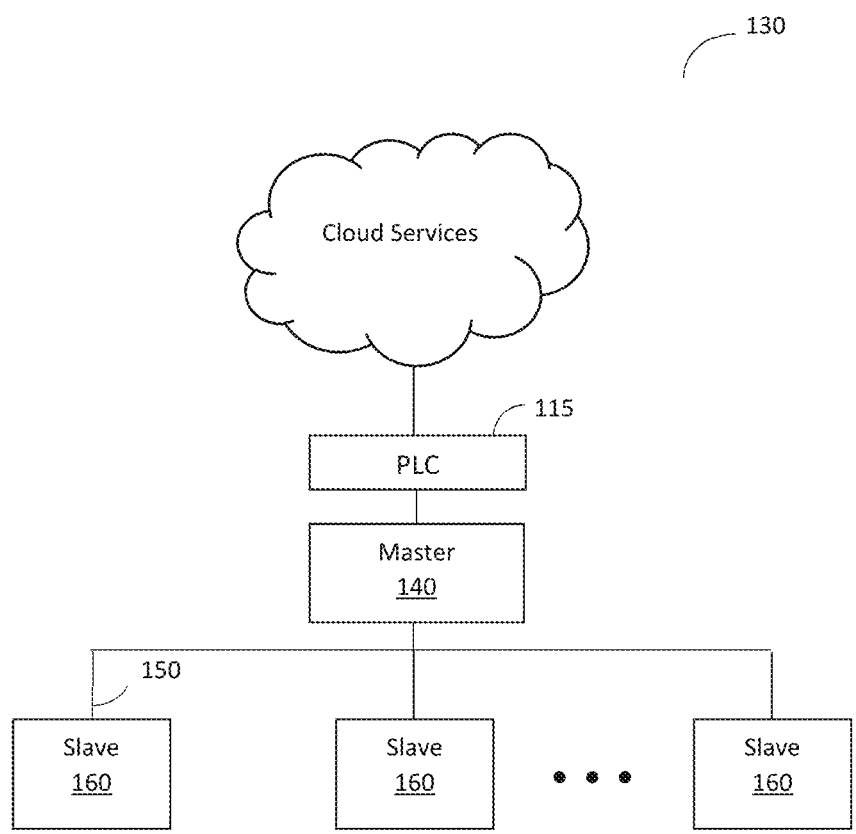
Figure 1C:
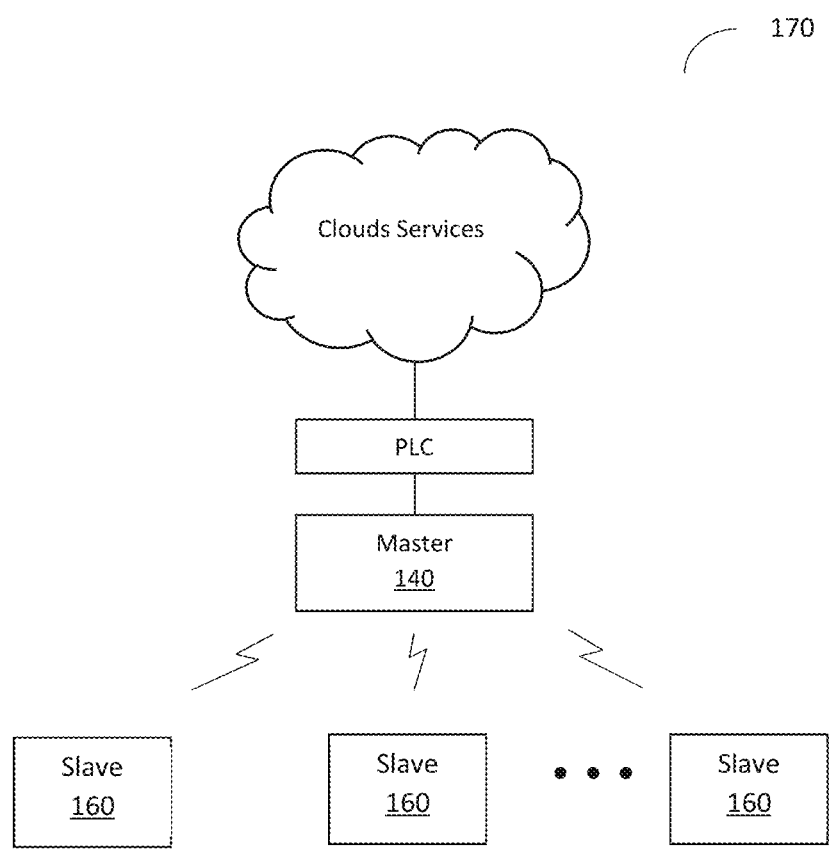
FIG. 1C is a diagram of standard IO-Link Wireless (IOLW) system (prior art).
Figure 2:
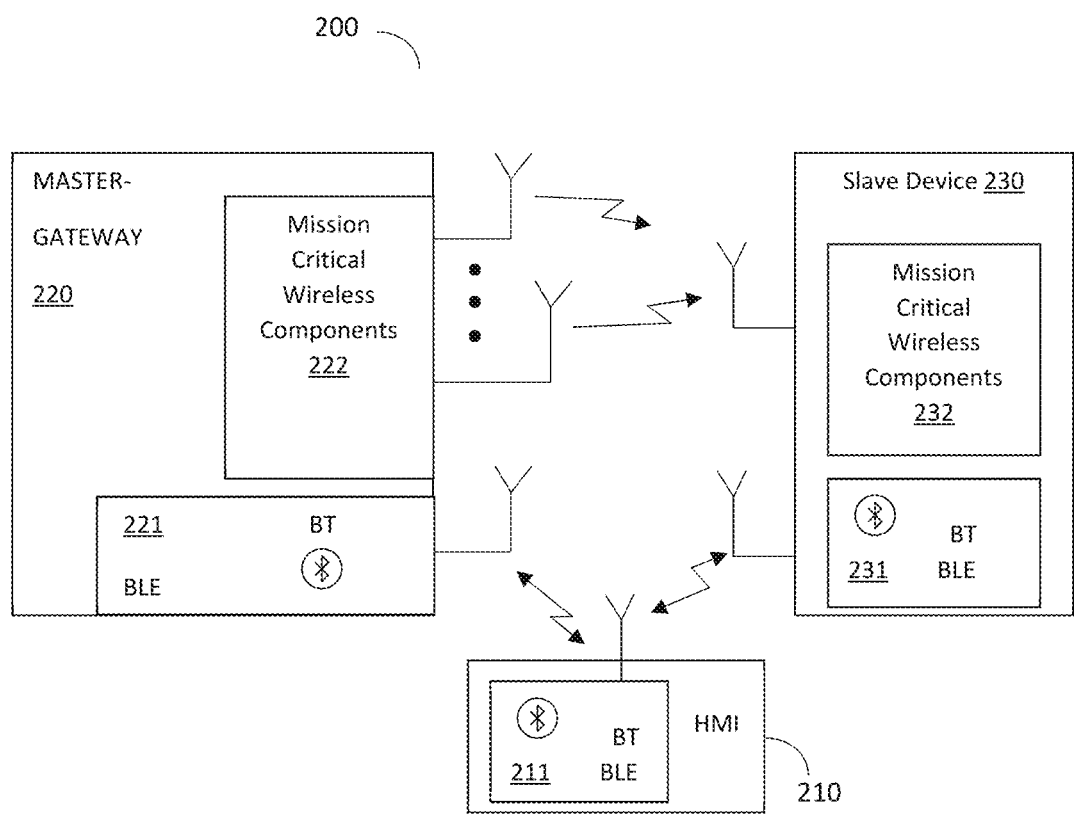
FIG. 2 depicts a standard solution for providing HMI communication in a MCWL system (prior art).

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a human machine interface (HMI) to a mission critical wireless link (MCWL) system using a standardized and commercially available wireless protocol. In an example implementation, such a wireless protocol is a Bluetooth Low Energy (BLE) protocol and the MCWL is an IO-Link® Wireless (IOLW) defined in the IO-Link® Wireless System Specification, first version published in March 2018. Thus, the disclosed embodiments allow for connecting an HMI terminal without any dedicated BLE transceiver (radio) by any IOLW node in a IOLW system. An IOLW node may include a slave or a master gateway and will be referred hereinafter as a "MCWL node."

Figure 3:
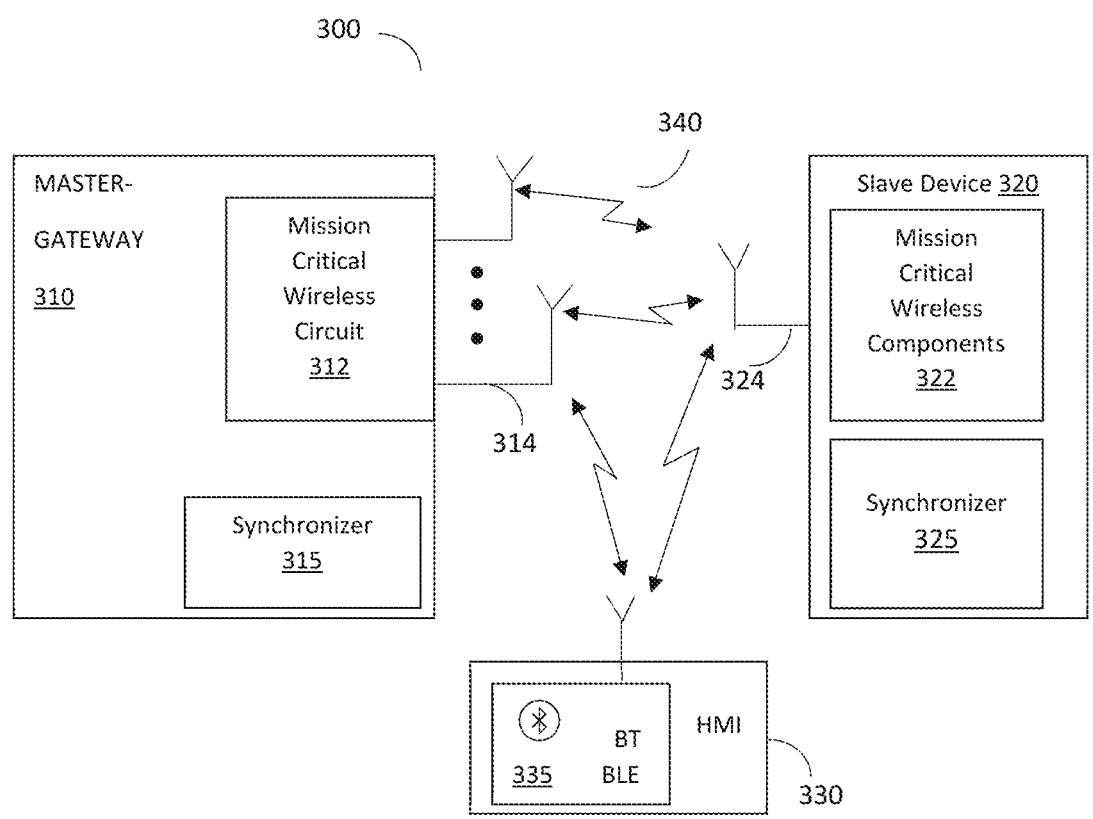
FIG. 3 is a diagram of a MCWL system utilized to describe the various disclosed embodiments.

FIG. 3 is an example diagram of a MCWL system 300 utilized to describe the various disclosed embodiments. In the example embodiment shown in FIG. 3, a master gateway 310 communicates with a slave (device) 320 over a mission critical wireless link 340. In example, the protocol employed by the link 340 is the IOLW.

The master gateway 310 communicates with a number of slaves (only one slave is shown in FIG. 3) over several tracks. To this end, the master gateway 310 includes a mission critical wireless circuit 312 coupled to an antenna array 314. The antenna array 314 may include one or more transmitter/receiver (TX/RX) antennas. The master gateway 310 also includes a synchronizer enabling the communication with an HMI terminal 330.

Each track may be enabled for time-division multiplexing communication between up to eight slaves. In one configuration, the master gateway 310 may include a plurality of receivers (not shown) configured to wirelessly communicate with the plurality of slaves; a processing circuitry (not shown) coupled to the plurality of receivers; and a memory (not shown) containing instructions that, when executed by the processing circuitry, configure the processing circuitry to at least control the operation of the plurality of receivers such that at least one of the plurality of receivers is configured to receive a plurality of transmissions from the slaves in succession where a guard time between transmissions is substantially shorter than a processing delay of the transmissions by the at least one receiver. An example implementation for allowing a master gateway 310 to communicate with a plurality of slaves using a single radio (circuit 312) is disclosed in U.S. patent application Ser. No. 16/446, 004, assigned to the common assignee, the contents of which are hereby incorporated by reference.

The slave 320 communicates over the spectrum of the industrial, scientific, and medical (ISM) band. The ISM band is a group of radio frequencies (RF) that are internationally designated for use in the industrial, scientific, and medical fields. In one such band, the channels are spaced apart by 1 megahertz (MHz) and extend from 2,400-2,480 MHz.

The slave 320 includes a mission critical wireless circuit 322 coupled to a single antenna 324. The slave 320 also includes a synchronizer 325 enabling the communication with the HMI terminal 330.

According to the disclosed embodiments, the HMI terminal 330 is configured to interface with the master gateway 310 and slave 320 over the same frequency band as the mission critical wireless link 340. The HMI terminal 300 may be a laptop computer, a tablet, a smartphone, and the like. The HMI terminal 330 may be utilized for real-time diagnostic, configuration, validation, installation, and debugging. The HMI terminal 330 does not include any means that support the MCWL, and in particular the IOLW protocol. In an embodiment, the HMI terminal 330 includes at least a BLE transceiver 335, and therefore can connect and communication with other devices (not shown) over the BLE communication network.

Typically, BLE devices are detected through a procedure based on broadcasting advertising packets. The BLE communication protocol defines three (3) separate channels (frequencies) in order to reduce interferences. The advertising device sends a packet on at least one of three advertising channels, with a repetition period "the advertising interval". For reducing the chance of multiple consecutive collisions, a random delay of up to 10 milliseconds is added to each advertising interval. A scanner listens to the advertising channels during a scan window, which is periodically repeated every scan interval.

According to the disclosed embodiments, the BLE radio 335 in the HMI terminal 330 provides a wireless interface to the master gateway 310 and slave 320 through BLE communication. This is performed by toggling between advertise and scan BLE modes at certain time intervals. The toggling is managed by a synchronizer (315 and 325). The synchronizer is designed in a way such that the controlled time intervals are designed to ensure the fidelity of the MCWL system, thereby allowing the reuse of the mission critical wireless circuit (i.e., IOLW radio) for HMI communication.

Figure 4A:
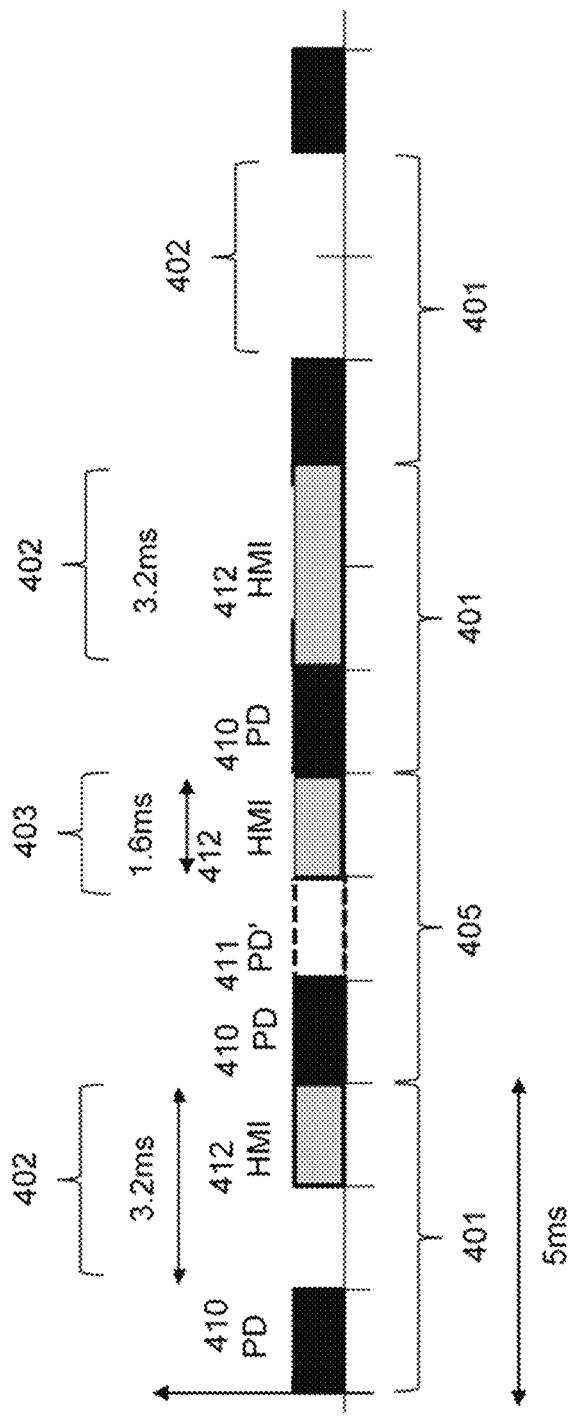
Figure 4C:
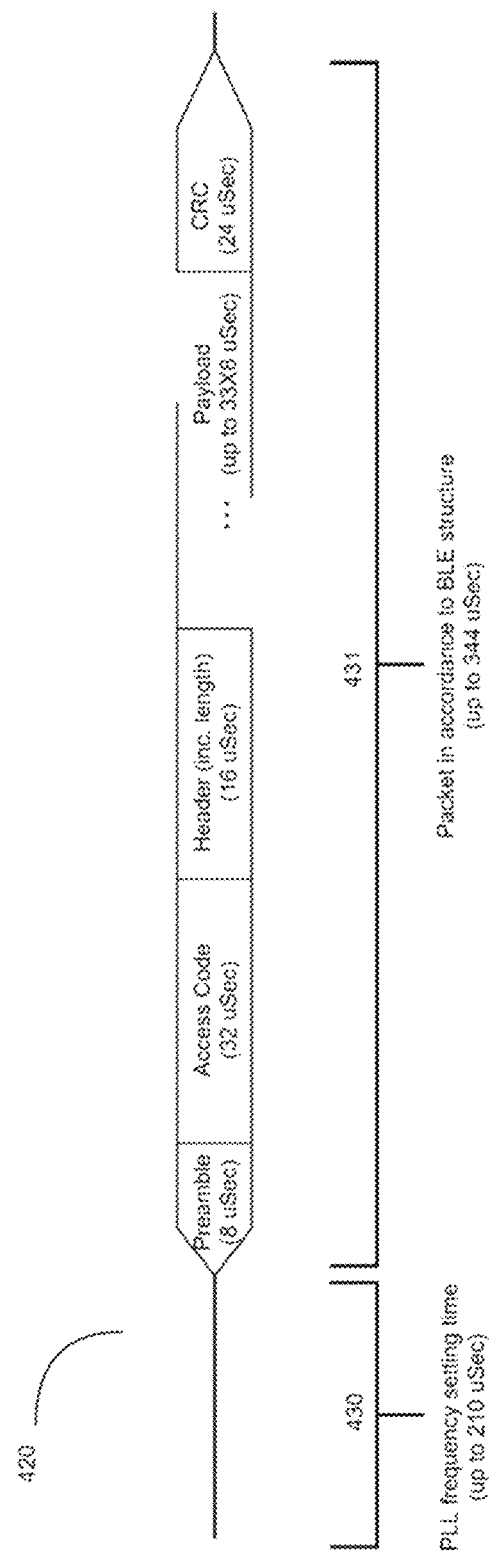

FIGS. 4A, 4B and 4C are time diagrams demonstrating time intervals utilized for HMI communication in a MCWL system. The assignment of specific time intervals the HMI communication is performed by the synchronizer, i.e., either the synchronizer 315 or 325 in the gateway 310 or slave 320, respectively.

As demonstrated in FIG. 4A, a MCWL system implementing an IOLW protocol utilizes a deterministic time profile. The minimal duration of a cycle 401 is 5 milliseconds (ms). Each cycle 401 starts with a sub-cycle which serves process data (PD) 410 of the critical cycle data. The retransmission mechanism is realized by repetition of the PD 411 in the next sub-cycle. For example, such repetition demonstrated in the second cycle 405 shown in FIG. 4A.

For example, according to the IOLW specification, when only the PD is transmitted, the available unused time in a cycle (402) is typically 3.2 ms. When the process data (PD) and single repetition is also transmitted, the available time interval (403) is 1.6 ms. According to the disclosed embodiments, during such available sub-cycle time intervals, the synchronizer can assign an available time interval (412) for HMI communication. The duration of such time interval may be of about 1.6 ms.

FIG. 4B depicts a zoom-in of the cycle 401 of FIG. 4A. In this case, the synchronizer assigns the last sub-cycle time interval (420) for HMI communication. The time interval (412) may support transmissions of one or more packets.

The communication between an HMI terminal and an MCWL node is allowed and performed only within the designated available time intervals. Therefore, the communications to and from a MCWL node does not interfere with the MCWL network. As a result, the performance of the mission critical data is unaffected.

In an example implementation, an uplink connection is defined from a MCWL node to an HMI terminal (e.g., the HMI terminal 330). In the opposite direction, a downlink connection is from the HMI terminal to a MCWL node. A message on the uplink and downlink connection is performed using a constant set of one or more BLE packet repetitions.

FIG. 4C is a zoom-in view of an uplink HMI communication packet 420 depicted in FIG. 4B. A possible packet structure as used in BLE beacons. The HMI communication packet 420 starts with a PLL transition time window (430) to allow frequency setting time, followed by a packet 431. The packet's 431 structure is defined by the BLE protocol. The maximal time for the HMI communication is limited by the IOLW sub-cycle time interval (interval). The duration of such time interval may be between 1.664 ms and 11 ms.

In order to support at least 3 consecutive packet repetitions in a sub-cycle time interval, a maximal payload of 33 bytes is showed. Thus, the HMI uplink communication allows PLL settling time of 210 microsecond (usec) followed by a maximal packet length of 344 usec, for a total of 554 usec (three repetitions within a sub-cycle time interval of 1.664 ms).

Figure 5:
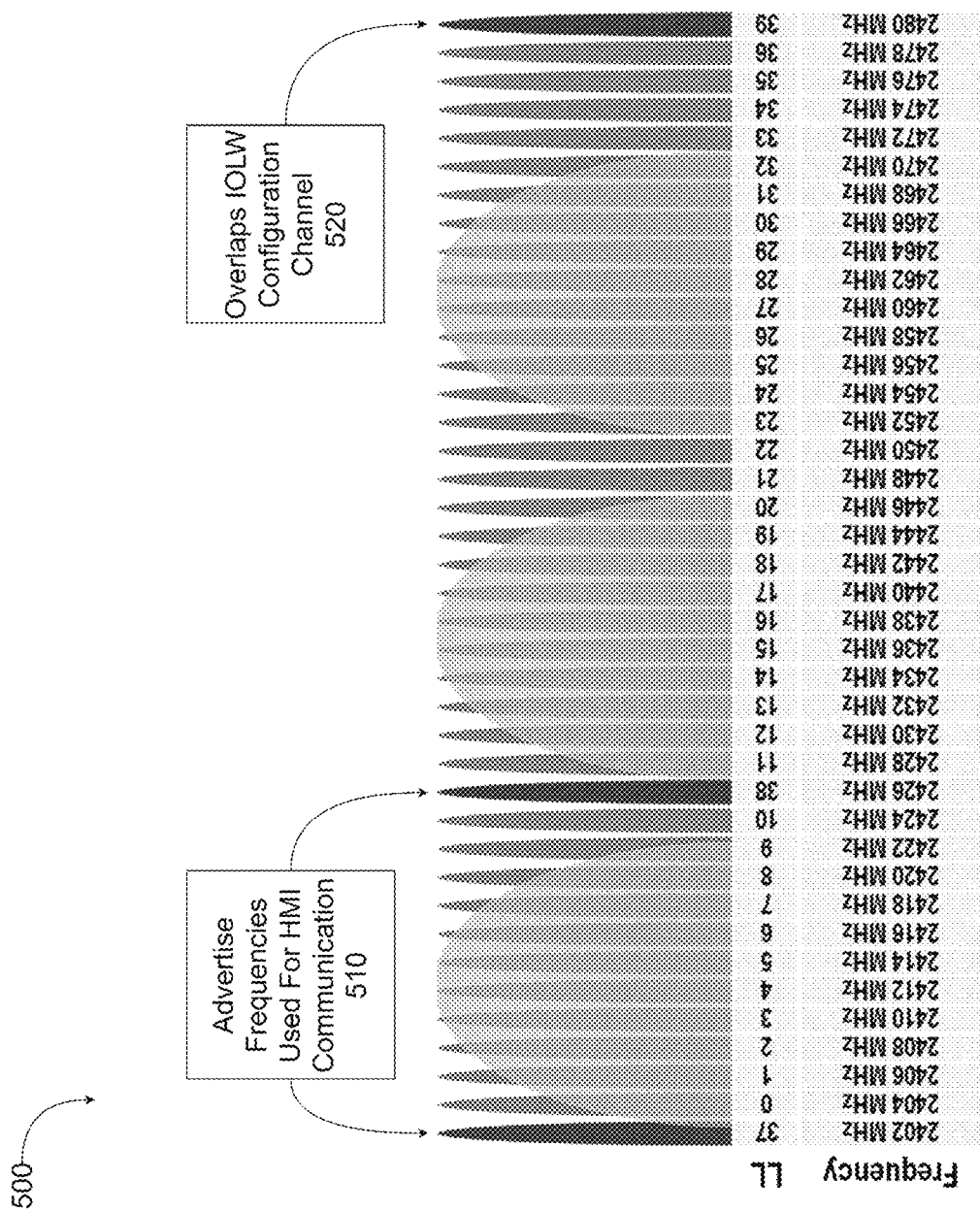
FIG. 5 illustrates channels utilized for HMI communication in the BLE frequency spectrum according to an embodiment.

FIG. 5 is an example diagram 500 of the 2.4 GHz ISM band. The BLE communication standard defines 40 frequency channels with 2 MHz spacing. Channels 37, 38, and 39 are the BLE advertising channels. In an embodiment, since one of the two IOLW configuration frequencies overlaps advertising channel 39 (2,480 MHz), this channel (labeled as 520) is not utilized for HMI configuration. Thus, the available BLE advertising channels 37 and 38 (labeled as 510) are the only advertising channels utilized for the HMI communication. In an embodiment, the advertising channels labeled 37 and 38 are blacklisted by the IOLW network to avoid interferences by the unsynchronized HMI terminals on IOLW network.

Figure 6A:
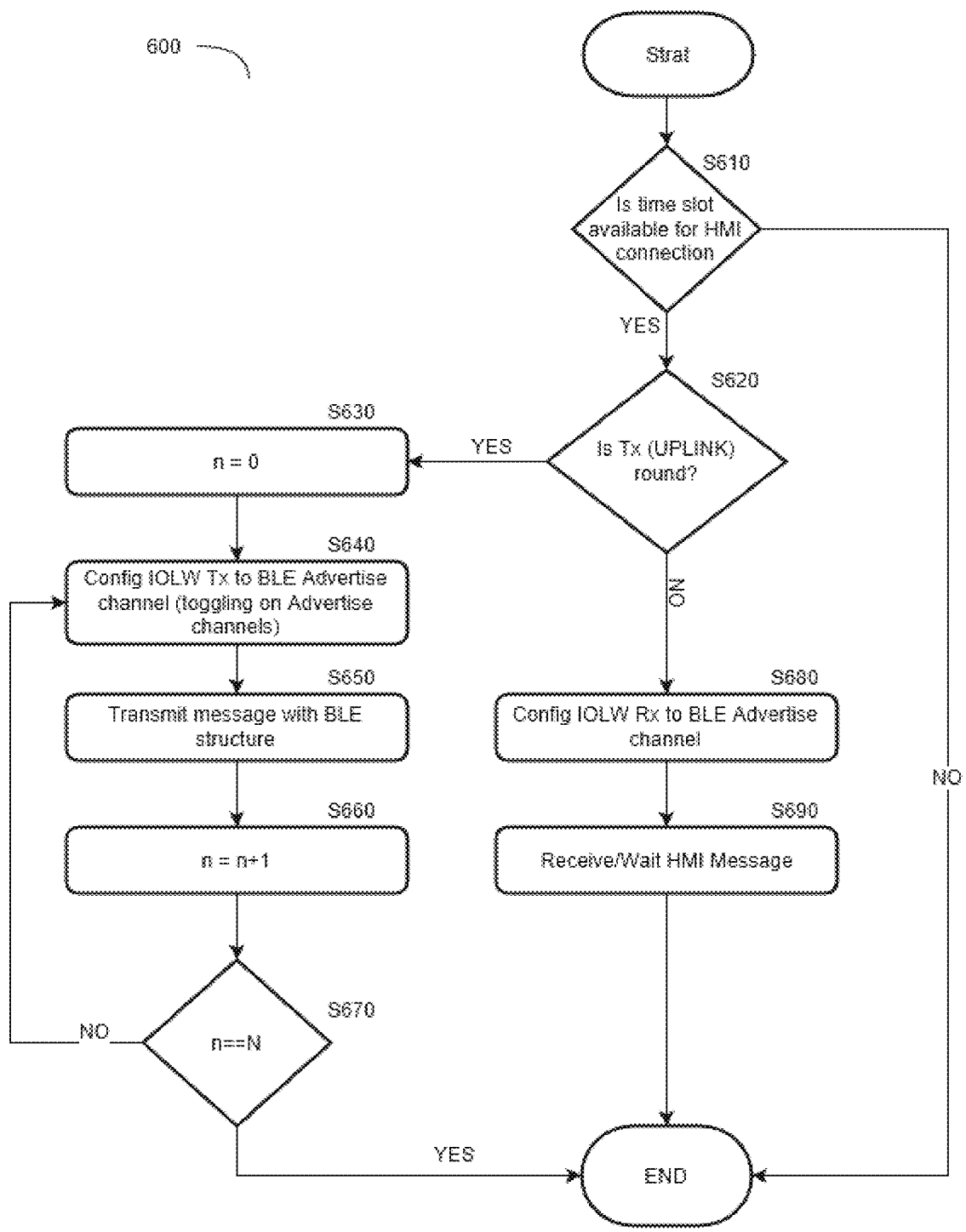
FIG. 6A illustrating a communication protocol between an MCWL node and an HMI terminal according to an embodiment.

FIG. 6A is an example flowchart 600 illustrating a communication protocol between an MCWL node and an HMI terminal according to an embodiment. The MCWL node may operate according to the IOLW standard specification discussed above.

At S610, it is checked whether current time interval is available for HMI communication. The check may be performed by the synchronizer, e.g., one of the synchronizers 315 or 325 shown in FIG. 3 and depending on the MCWL node attempting to perform the HMI communication.

When current time interval is not available for HMI communication, execution ends. Otherwise, when there is an available time interval, at S620 it is determined whether such time interval is assigned for a BLE TX (uplink) (YES) or BLE RX (downlink) (NO) round. In case of an uplink assignment, an uplink message is sent repeatedly according to a fixed sub-cycle time interval (e.g., 1.66 ms).

At S630, the number of transmissions is initialized, for example as 0. At S640, to allow transmission of each BLE uplink message, the transmitter's frequency is configured to one of the BLE advertising channel (as depicted in 510, FIG. 5). At S650, the packet is transmitted. This process is repeated until the required number of re-transmissions of packets (S660 and S670) are fulfilled.

In case of a downlink round, at S680, a receiver is set to one of the BLE advertising channels. This allows the receiver to scan for a packet from the HMI terminal operating in an BLE scan mode. At S690, a message from the HMI terminal is received and decoded. The receiver may receive and acknowledge successfully or unsuccessfully reception of such messages. A successful acknowledgment of a packet would increase a counter indicating the next message to be transmitted.

Figure 6B:
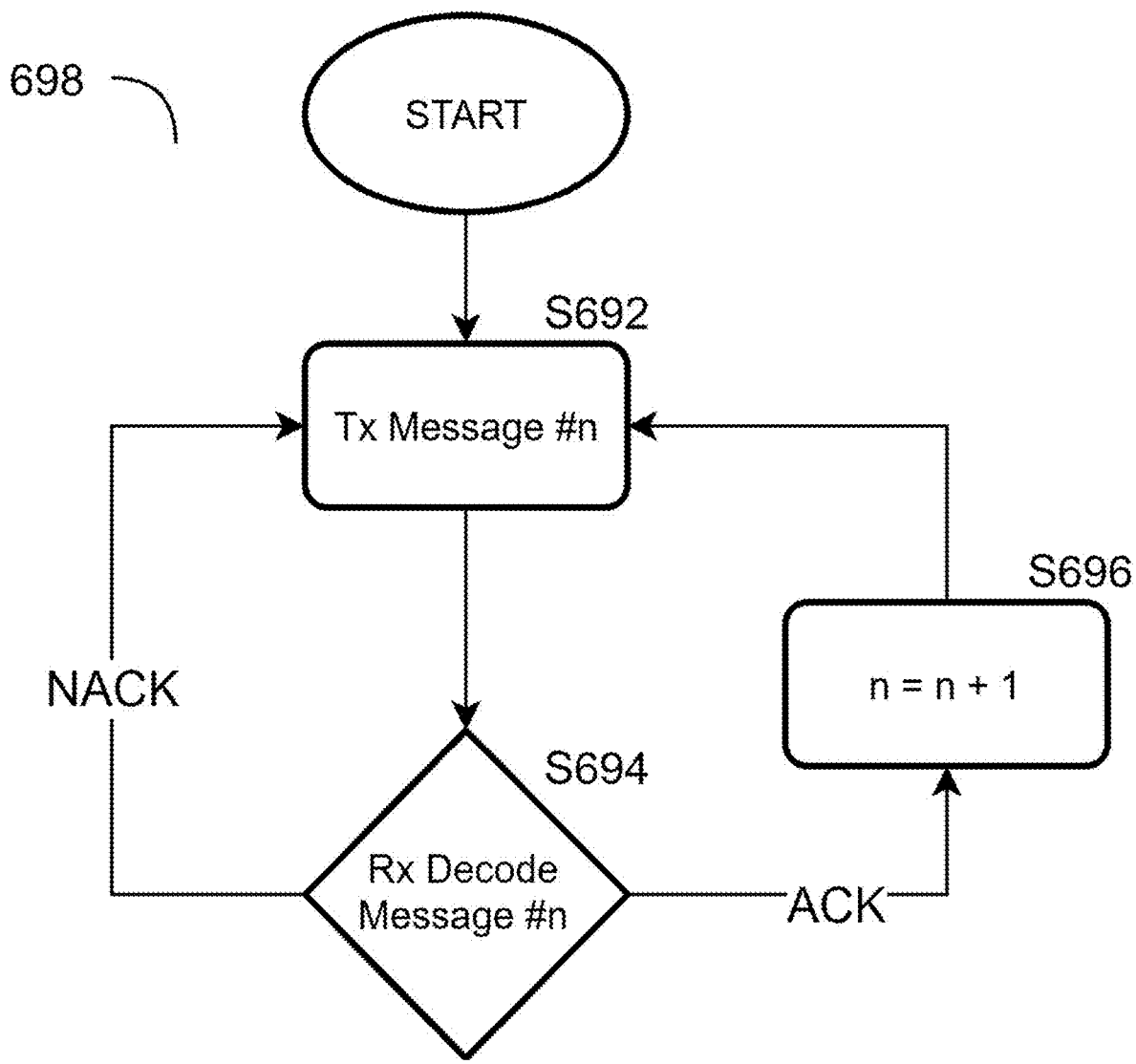
FIG. 6B illustrating a flowchart of a messaging protocol as implemented by an IOLW node according to an embodiment.

FIG. 6B is an example flowchart 698 of a messaging protocol as implemented by an IOLW node according to an embodiment. At S692, a message number 'n' is transmitted. The message identifier is part of the information in the payload bits. This message identifier may be truncated to number of bits enough large to prevent ambiguous decoding. If the followed received message at S694 from the HMI terminal is with the same message identifier and information, and acknowledge is asserted and the message identifier is increased (S696). If message was not acknowledged or received, then message identifier remains the same.

Figure 9:
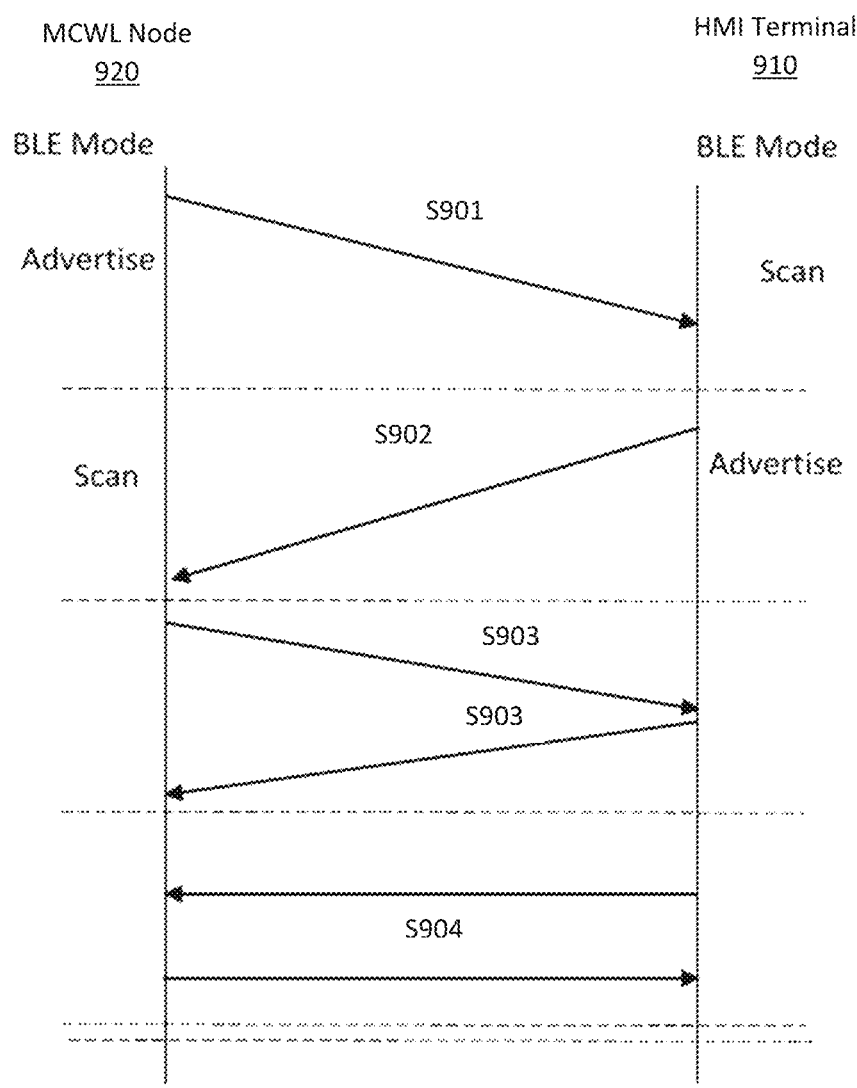
FIG. 9 is a diagram illustrating a handshake process for establishing secured authentic channel between an HMI terminal and an MCWL node according to an embodiment.

It should be noted that a receiver and transmitter discussed with reference to FIG. 6 are part of the mission critical wireless circuit discussed included in each of MCWL node. An example transceiver (receiver and transmitter) implemented by an MCWL node is shown in FIG. 9.

Figure 7:
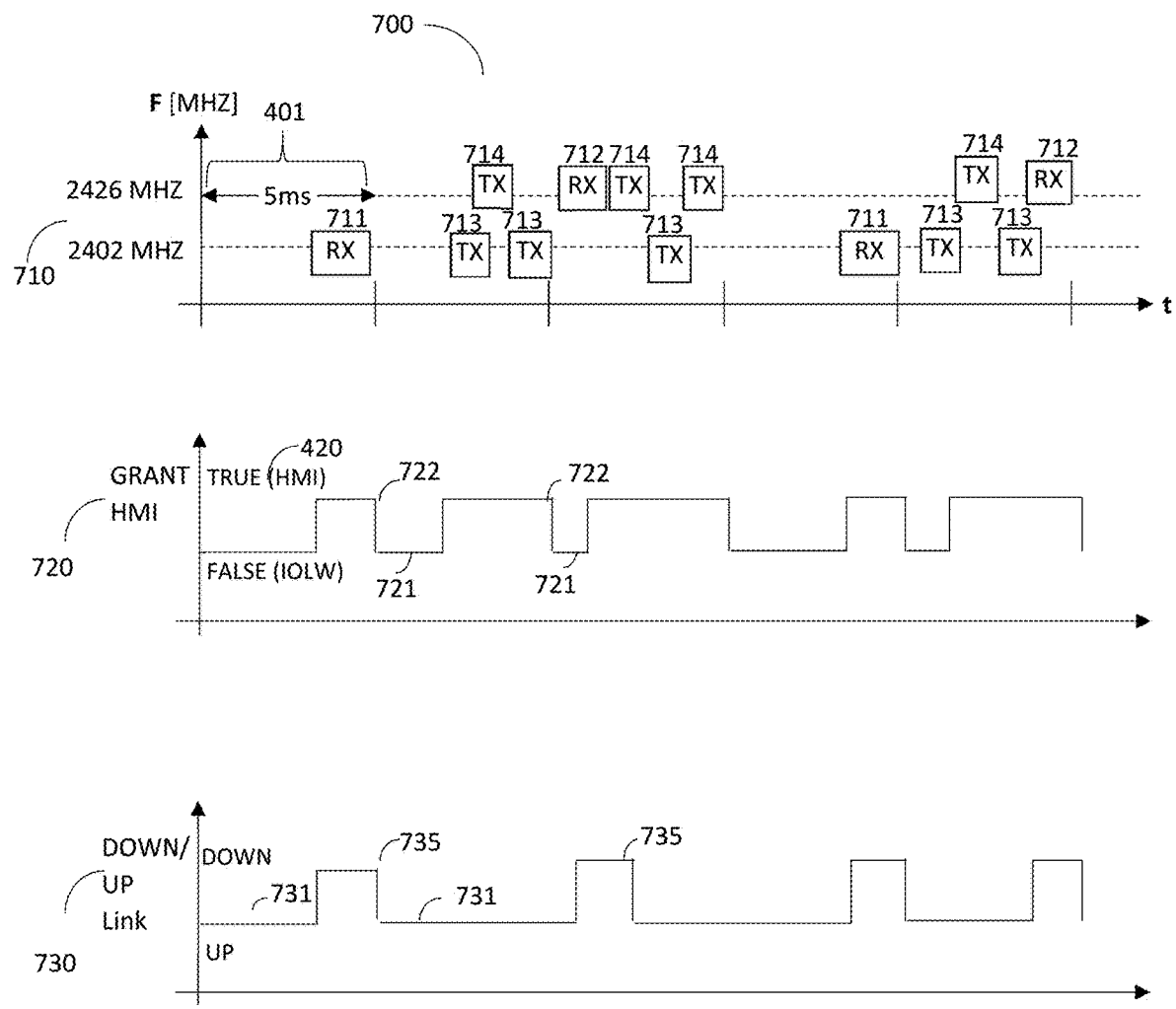
FIG. 7 is a timing diagram of a control signal generated by the synchronizer according to an embodiment.

FIG. 7 shows a timing diagram 700 of a control signal generated by the synchronizer according to an embodiment. The diagram 700 illustrates an advertising channel 710, an HMI grant signal 720, and the downlink/uplink control signal 730. The diagram 700 also illustrates a channel utilization 710 of the BLE advertising channels by an MCWL node.

When an HMI grant signal 720 is set (labeled as state 722), there is an available timeslot (a current sub-cycle time interval) for an HMI communication. When the signal 720 is clear (labeled as state 721), the current sub-cycle time interval is available for the MCWL transmission. The HMI grant signal 720 prioritizes mission critical data transmission.

The downlink/uplink signal 730 is toggled per available the sub-cycle time interval. In the example diagram 700, the toggling is performed on each available (to HMI communication) sub-cycle time interval. While the downlink/uplink signal 730 is set (labeled as state 735) and the HMI grant is also set (labeled as state 722), then the sub-cycle time interval is assigned for the downlink.

The utilization of the advertising channel 710 is at a state 711 for advertising channel 38 (2402 MHz) and at a state 712 for advertising channel 39 (2426 MHz). The downlink/uplink signal 730 is at clear state (731) and HMI grant signal is at a set state (722), the sub-cycle time interval is assigned for the uplink. The advertising air utilization signal 710 is at the clear state (713) for advertising channel (2402 MHz) and at a state (714) for advertising channel 2426 MHz. It should be noted that within the minimal time interval of sub-cycle and maximal payload length a number of three (3) consecutive messages can be transmitted.

Figure 8:
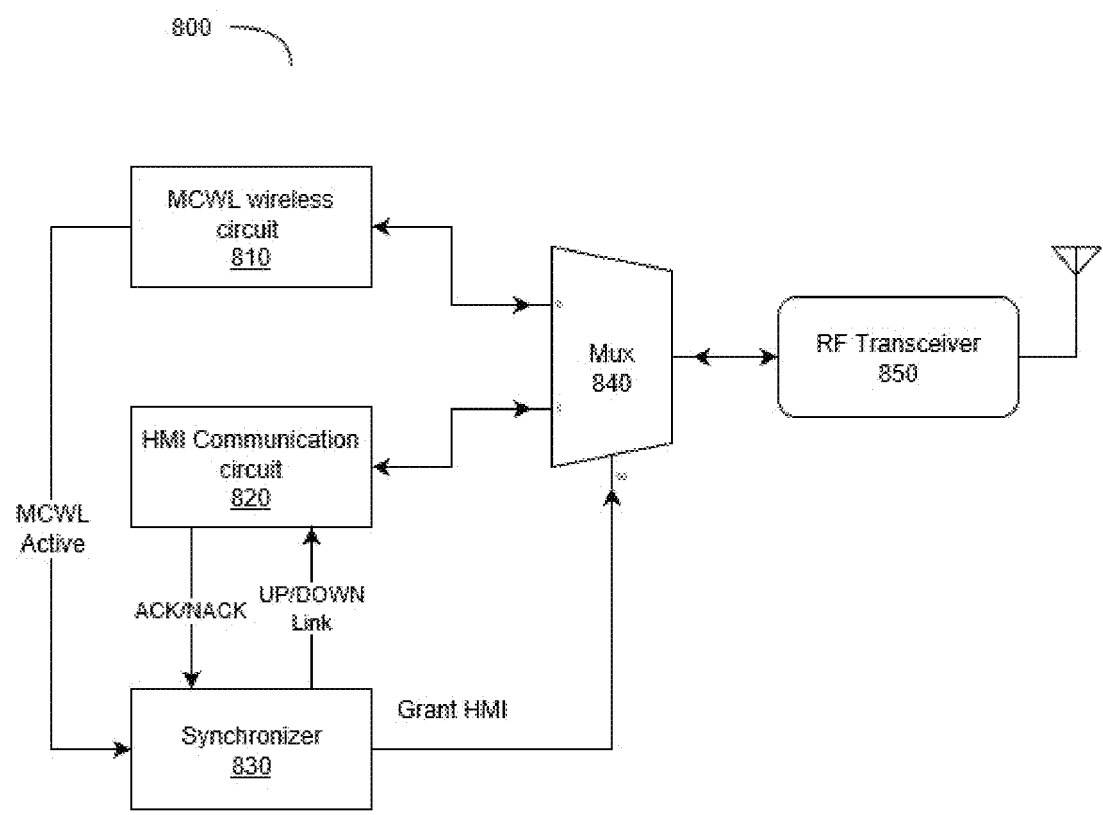
FIG. 8 is an example block diagram of an MCWL node designed according to an embodiment.

FIG. 8 shows an example block diagram of a MCWL node 800 designed according to an embodiment. The MCWL node 800 may be either a master gateway or a device. The example MCWL node 800 includes a MCWL wireless circuit 810, an HMI communication circuit 820, and a synchronizer 830 coupled to a multiplexer (Mux) 840. The multiplexer 840 is connected to an RF transceiver 850.

The RF transceiver 850 is utilized for communicating with another MCWL node and HMI terminal (not shown). The selection is based on an HMI grant signal issued by the synchronizer 830. It should be noted that, when the RF transceiver 850 is implemented in a master gateway, the RF transceiver 850 can support multiple tracks and include a plurality of antennas.

The synchronizer 830 is configured to receive the HMI communication information status and an IOLW Active signal which indicates the availability of the IOLW network. The information status includes the of ACK/NACK of last transmitted message. Based on the information status and signals, the synchronizer 830 is configured to set the up/down link signal and the HMI grant signal which serves as an input to the MUX 840. The MUX 840 selects whether to allow IOLW communication or HMI communication.

FIG. 9 is a flow diagram illustrating a handshake process 900 for establishing secured authentic channel between an HMI terminal 910 and an MCWL node 920 according to an embodiment. Both the HMI terminal 910 and an MCWL node 920 operate in a BLE mode.

At S901, the MCWL node 920 starts by sending, via the BLE advertising channel, a connection request message containing the relevant attributes of the MCWL node. S901 is repeatedly performed until an acknowledgement message is detected from the HMI terminal 910. The acknowledge message is detected at S902.

At S903, authentication and challenge of the HMI terminal 910 is performed. Once the authentication is completed, the MCWL node 920 and the HMI terminal 910 can communicate with each other.

At S904, once the secured channel is established, the HMI terminal 910 can execute commands to control, monitor, configure, or obtain data, or a combination thereof, from the IOLW device 920. In an embodiment, the commands may be in a proprietary format. The commands can be executed using the host controller interface (HCI). The HCI allows transports of commands and events between the host and controller elements of the Bluetooth protocol stack.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A mission critical wireless link (MCWL) node for communicating with a human machine interface (HMI) terminal over a mission critical wireless link, comprising:
    a MCWL wireless circuit configured to communicate with a first MCWL node over the mission critical wireless link by employing a mission critical communication protocol;
    an HMI communication circuit for communicating with an HMI terminal over the mission critical wireless link by employing a short-range communication protocol;
    a synchronizer for controlling at least a time at which the MCWL wireless circuit and the HMI communication circuit access the wireless link;
    a multiplexer coupled to the MCWL wireless circuit and the HMI communication circuit, wherein the multiplexer is configured to select any of the MCWL wireless circuit and the HMI communication circuit based on a control signal received from the synchronizer; and
    a radio frequency (RF) transceiver configured to wirelessly communicate with both the first MCWL node and the HMI terminal; and wherein the synchronizer is further configured to:
    determine if there is an available time interval for HMI communication with the HMI terminal;
    determine if the available time interval is assigned for an uplink communication or a downlink communication when there is an available time interval;
    set the RF transceiver to transmit HMI messages on a preconfigured frequency channel when the available time interval is assigned to the uplink communication;
    set the RF transceiver to receive HMI messages one a preconfigured frequency channel when the available time interval is assigned to the downlink communication; and
    set the control signal when there is an available time interval, wherein the control signal is set to select the HMI communication circuit by the multiplexer, wherein the short-range communication protocol is a Bluetooth Low Enemy (BLE) protocol.

2. The MCWL node of claim 1, wherein the preconfigured frequency channel is one of a BLE advertising channels.

3. The MCWL node of claim 1, wherein the MCWL node is a slave and the first MCWL node is a master gateway.

4. The MCWL node of claim 3, wherein the MCWL node is a master gateway and the first MCWL node is a slave.

5. The MCWL node of claim 3, wherein the MCWL node is a master gateway and the first MCWL node includes a plurality of slaves.

6. The MCWL node of claim 5, wherein the master gateway further comprises:
    a plurality of receivers configured to wirelessly communicate with the plurality of slaves;
    a processing circuitry coupled to the plurality of receivers; and
    a memory containing instructions that, when executed by the processing circuitry, configure the processing circuitry to at least control the operation of the plurality of receivers, such that at least one of the plurality of receivers is configured to receive a plurality of transmissions from the plurality of slaves in succession, wherein a guard time between transmissions is substantially shorter than a processing delay of the transmissions by the plurality of receivers.

7. The MCWL node of claim 1, wherein the mission critical communication protocol is an IO-Link Wireless protocol.

8. The MCWL node of claim 1, wherein the MCWL node is further configured to establish a secured communication channel with the HMI terminal.

9. The MCWL node of claim 8, wherein the MCWL node is further configured to:
    send, on a Bluetooth low energy (BLE) advertising channel, a connection request message to the HMI terminal;
    perform an authentication process with the HMI terminal; and
    establish the secured communication channel with the HMI terminal when the authentication process is successfully completed.

10. The MCWL node of claim 9, wherein the HMI terminal is configured to perform, in real-time, any one of: diagnostic, configuration, validation, installation, and debugging of the MCWL node.

11. A method for communicating with a human machine interface (HMI) terminal over a mission critical wireless link (MCWL), comprising:
    determining if there is an available time interval for a MCWL node to communicate with the HMI terminal;
    issuing an HMI grant signal allowing the MCWL node to communicate with the HMI terminal over the mission critical wireless link when there is an available time interval;
    determining if the available time interval is assigned for an uplink communication or a downlink communication when there is an available time interval;

issuing an uplink control signal to allow transmitting HMI messages to the HMI terminal when the available time interval is assigned to the uplink communication;

issuing an uplink control signal to allow reception of HMI messages from the HMI terminal when the available time interval is assigned to the downlink communication;

establishing a secured communication channel with the HMI terminal;

sending, on a Bluetooth low enemy (BLE) advertising channel, a connection request message to the HMI terminal;

performing an authentication process with the HMI terminal; and establishing the secured communication channel with the HMI terminal once the authentication process is successfully completed.

* * * * *